June 9, 1959     H. O. SCHJOLIN ET AL     2,889,718
V-DRIVE TRANSMISSION WITH HYDRAULIC CLUTCH
Filed June 21, 1956     4 Sheets-Sheet 1

INVENTORS
Hans O. Schjolin &
BY Willis V. Parshall
W. C. Middleton
ATTORNEY June 9, 1959     H. O. SCHJOLIN ET AL     2,889,718
V-DRIVE TRANSMISSION WITH HYDRAULIC CLUTCH
Filed June 21, 1956     4 Sheets-Sheet 2

INVENTORS
Hans O. Schjolin &
BY Millis V. Parshall
W. C. Middleton
ATTORNEY

United States Patent Office 2,889,718
Patented June 9, 1959

2,889,718

V-DRIVE TRANSMISSION WITH HYDRAULIC CLUTCH

Hans O. Schjolin, Birmingham, and Millis V. Parshall, Pontiac, Mich., assignors to General Motors Corporation, Detroit, Mich., a corporation of Delaware Application June 21, 1956, Serial No. 592,935

20 Claims. (Cl. 74—732)

This invention relates to transmissions and controls therefor and more particularly to a transmission incorporating a hydraulically controlled clutching unit and a manually shiftable gear box wherein drive to the gear box may be had either through a hydrodynamic torque converter or by a direct drive connection to the engine by selective actuation of one of two hydraulically actuated clutches. The transmission and control system described herein is particularly adapted for use in heavy duty vehicles such as trucks, busses, and military vehicles but may be employed in other vehicles as desired.

An object of this invention is to provide a transmission incorporating a manually shiftable gear box adapted to be selectively driven through one of a pair of hydraulically actuated friction clutches and incorporating means controlled by a manually operable drive ratio selector lever for releasing both of the clutches during the interval in which selection of drive ratio in the manually shiftable gear box is accomplished.

Another object of this invention is to provide a transmission incorporating a manually shiftable gear box adapted to be selectively driven through one of a pair of hydraulically actuated friction clutches having a manually operable shift lever connected to the gear box to select forward, neutral or reverse drive and having electrical means controlled by the shift lever to automatically establish release of both of the clutches during movement of the lever from neutral to forward, from neutral to reverse, or from forward to the reverse position of the shift lever, and to automatically reestablish drive through one of the clutches upon completion of change of drive ratio.

An additional object of this invention is to provide in a transmission having a manually controlled slidable gear box adapted to select forward, neutral or reverse, a first fluid pressure actuated clutch adapted to establish drive to the gear box through one torque path and a second fluid pressure actuated clutch adapted to establish drive to the gear box through a second torque path together with a valve controlled by a manually operable drive range selector lever wherein the valve is effective during movement of the selector lever from one position to another to cause release of both of the clutches, and wherein the valve is effective upon completion of movement of the lever to a selected position to cause re-engagement of one of said clutches.

Another object of this invention is to provide in a transmission of the class described a hydraulic control system including a first shift valve yieldably biased to admit fluid pressure to a first servo to establish drive through one torque path and a second shift valve yieldably biased to connect a second clutch servo to exhaust wherein the first shift valve is provided with a control chamber initially connected to exhaust through a shuttle valve, and wherein a valve controlled by a forward, neutral, reverse manually operable selector lever is adapted to admit fluid pressure to the first shift valve control chamber through the shuttle valve during movement of the selector lever from one position to another to position the first shift valve to connect the first clutch servo to exhaust.

A further object of this invention is to provide in a transmission having a manually controlled forward, neutral, and reverse, slidable gearing unit adapted to be selectively driven through either a hydrodynamic torque converter or a direct drive connection to the engine, a pair of hydraulically controlled clutches selectively actuatable for establishing the selected drive together with a solenoid valve controlled by a manual selector lever effective to release both of the clutches during movement of the selector lever from forward to neutral, neutral to reverse, or forward to reverse positions of the selector lever and effective in the forward and reverse position of the selector lever to establish drive through one of the clutches.

Another object of this invention is to provide a hydraulic control system for a transmission of the class described including a first shift valve yieldably biased to admit fluid pressure to a clutch servo to establish initial drive through a torque converter and a second shift valve yieldably biased to connect a direct drive clutch servo to exhaust, wherein the converter clutch valve is provided with a control chamber initially connected to exhaust through a shuttle valve and wherein a valve controlled by a forward, neutral, reverse selector lever is adapted to direct pressure to the converter clutch valve control chamber through the shuttle valve during movement of the selector lever from one position to another to position the converter clutch valve to connect the converter clutch servo to exhaust.

Still another object of this invention is to provide in a transmission of the class described, a control system including a first shift valve yieldably biased to admit fluid pressure to a first clutch servo to initially establish drive through a first clutch, and a second shift valve yieldably biased to connect a second clutch servo to exhaust, wherein there is provided a first control chamber associated with the first shift valve and initially connected to exhaust through a shuttle valve, and to provide a governor controlled valve adapted to deliver fluid pressure to a control chamber associated with the second valve to position the second valve to direct fluid pressure to the second clutch servo to establish drive through the second clutch and to deliver pressure to the first shift valve control chamber through the shuttle valve to position the first shift valve to release fluid pressure from the first clutch servo after the second clutch is engaged.

An additional object of this invention is to provide in a transmission incorporating a manually shiftable gear box adapted to be selectively driven through one of a pair of hydraulically actuated clutches having a manually operable shift lever for selecting forward, neutral or reverse in the gear box, a first shift valve yieldably biased to admit fluid pressure to one servo to establish drive through one clutch and a second shift valve yieldably biased to connect the other of the clutch servos to exhaust to release the other clutch, a control chamber associated with the first shift valve connected to a shuttle valve, a first control chamber associated with the shuttle valve, and a valve controlled by the shift lever for admitting pressure to the first shuttle valve control chamber to position the shuttle valve to admit pressure to first shift valve control chamber to position the first shift valve to establish neutral during movement of the shift lever from one position to another, and to provide a speed controlled valve adapted to deliver pressure to a control chamber associated with the second shift valve to position the second shift valve to engage the second of the pair of clutches, there being a connection from the delivery side of the second shift valve to admit pressure to a second control chamber associated with the shuttle valve and effective to position the shuttle valve to direct pressure to the first control chamber associated with the first shift valve to position the first shift valve to release the first clutch upon application of the second clutch, and to provide an additional valve adapted to deliver fluid pressure to a second control chamber associated with said first shift valve to position the first shift valve to engage the first clutch irrespective of the position of the second shift valve, the shuttle valve, or the valve controlled by the drive range selector lever.

These and other objects and advantages of the invention will be apparent from the following specification and claims taken in conjunction with the accompanying drawings in which:

Figure 1:
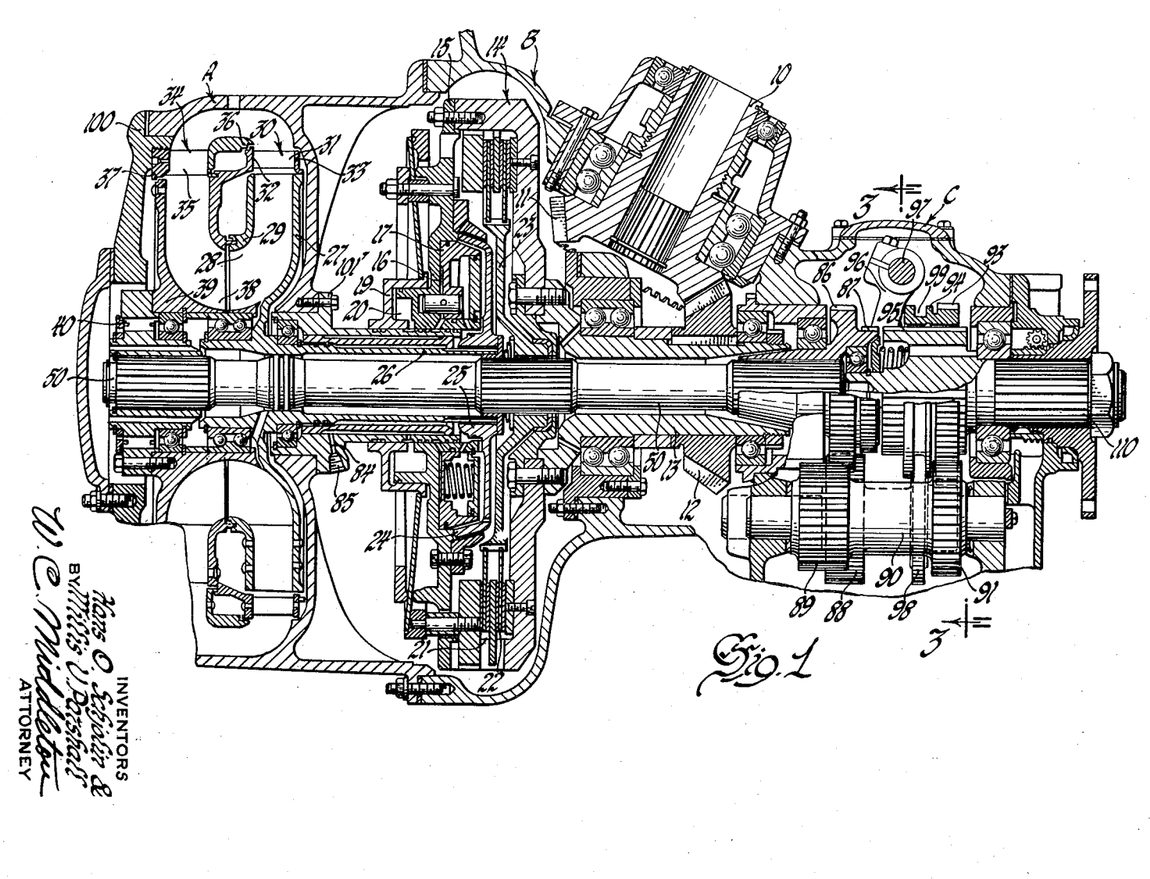
Figure 1 is a vertical section through a transmission constructed in accordance with the principles of this invention.

The transmission assembly shown in Figure 1 is made up of a hydrodynamic torque converter unit A, a clutching unit B, and a manually controllable slidable gear unit C adapted to provide forward direct drive, reverse reduction drive, or neutral or no drive.

A power input shaft 10 is adapted to drive an intermediate shaft 50 through either the torque converter unit A or directly as hereafter explained. Intermediate shaft 50 may be connected to the final output or load shaft 110 for either direct forward drive or reduction reverse drive. In addition the sliding gear unit C may provide a positive neutral wherein no drive can be imparted to shaft 110 from shaft 50.

As shown in Figure 1, an engine driven shaft 10 having a bevel gear 11 affixed thereto is adapted to drive a clutch drum 14 by means of a bevel gear 12 in mesh with gear 11, the gear 12 being keyed to a drive sleeve 13, the sleeve 13 being bolted to clutch drum 14. Detachably secured to drum 14 is a plate 15, the plate 15 being formed to provide an axially extending cylinder chamber 16 adapted to receive an annular piston 17 and an axially extending cylinder 18 adapted to cooperate with an external piston 19. Fluid pressure may be admitted to servo chambers 16 and 20 to actuate servo pistons 17 and 19, respectively, or may be admitted to both chambers 16 and 20 simultaneously as hereafter set forth. A pair of clutch plates 21 and 22 splined to a clutch hub 23 which in turn is splined to shaft 50 may be actuated to connect shaft 50 directly to engine shaft 10. A cone clutch 24 having its hub 25 splined to a sleeve 26 may be actuated to drive the impeller 27 of the hydrodynamic torque converter unit A. Impeller 27 carries blades 28 supported upon a ring member 29 and impeller 27. Located outwardly from impeller 27 is first-stage blading of a two stage turbine member 30 having blades 31 supported upon ring members 32 and 33. A reaction member 34 is provided with blades 35 supported upon a ring 36 and a ring 37 fixed to housing 100. Second stage turbine blading consists of blades 38 supported upon ring 32 and a hub 39.

A one-way clutch 40 positioned between the hub 39 and shaft 50 will drivingly connect turbine 30 to intermediate shaft 50 whenever impeller 27 is driven by shaft 10 at a speed greater than that of shaft 50. When the double clutch 21—22 is actuated to connect shaft 50 directly to shaft 10, the one-way clutch 40 will permit turbine 39 to idle. It will be understood that when clutch 21—22 is engaged, clutch 24 will normally be disengaged so that both the converter impeller 27 and turbine 39 are permitted to idle to eliminate hydrodynamic loss in the torque converter.

Figures 2, 3, 4A:
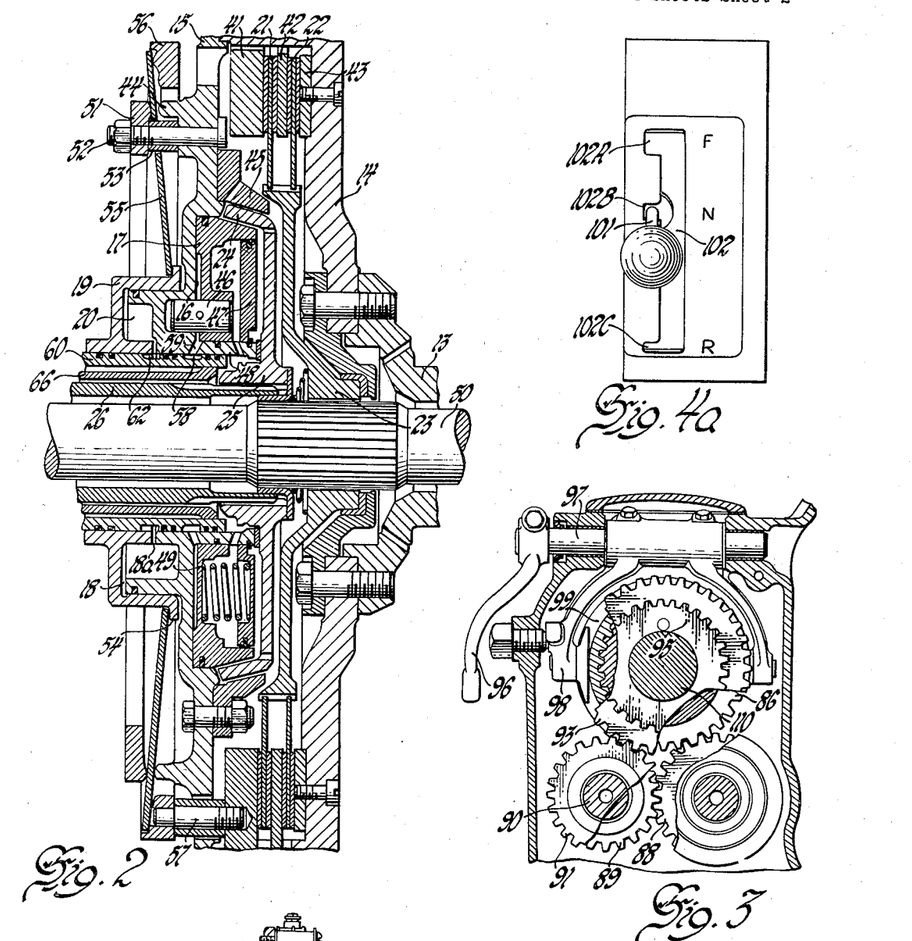
Figure 2 is an enlarged sectional view of the clutch position of Figure 1.
Figure 3 is a sectional view of the forward, neutral, reverse gear unit taken along the lines 3—3 of Figure 1.
Figure 4A is a view of the control handle and housing illustrating the housing slot arrangement for the handle.

Referring to Figure 2 which is an enlarged section of the clutching unit of Figure 1, the same numbers are applied in Figure 2 to parts which correspond to the numbered parts in Figure 1. Clutch drum 14 has splined thereto a pair of clutch presser plates 41 and 42 and has affixed thereto a clutch facing 43. Presser plates 41 and 42 are axially movable with respect to drum 14, but rotate therewith. Plate member 15 is provided with a boss 44 and a conical clutch backing member 45. Piston 17 is pinned to plate 15 by means of a pin 46 so that piston 17 may move axially with respect to plate 15 but will rotate with the plate. A backing member 47 mounted upon an axially extending cylindrical flange 48 of plate 15 forms a seat for a clutch release spring 49 positioned between member 47 and piston 17.

Bolted to plate 15 at a point opposite boss 44 is a boss 51. Mounting bolt 52 carries a bushing 53. External piston 19 is provided with an upstanding lip 54 to engage one end of a Belleville spring 55. Belleville spring 55, mounted upon bushing 53 between bosses 44 and 51, extends from lip 54 of servo piston 19 to an annular force transfer ring 56 which carries a stud bolt 57 secured to presser plate 41. Upon admission of fluid pressure to servo chamber 20, piston 19 will actuate Belleville spring 55 to move presser plate 41 to apply the double clutch 21—22. Upon the release of fluid pressure from chamber 20, the Belleville spring will release the presser plate 41 from clutch plate 21. Cone clutch 24 may be applied by admitting fluid pressure to servo chamber 16. Upon release of pressure from chamber 16, spring 49 will move servo piston 17 to release clutch 24. In Figure 2, fluid under pressure such as oil is supplied to and exhausted from servo chamber 16 through a groove 58 in housing sleeve 60 and a port 59. The manner in which oil under pressure is supplied to grooves 58 and 62 of sleeve 60 is shown in Figures 5, 6 and 7.

Figure 5:
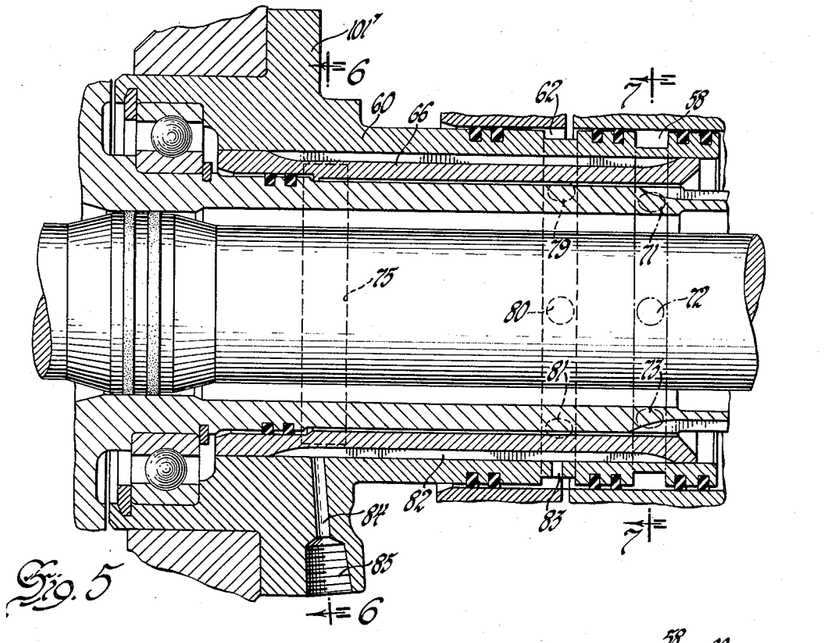
Figure 5 is an enlarged sectional view of a portion of Figure 1 illustrating the sleeve arrangement for admitting control pressure to the clutch control servo chambers.
Figure 6:
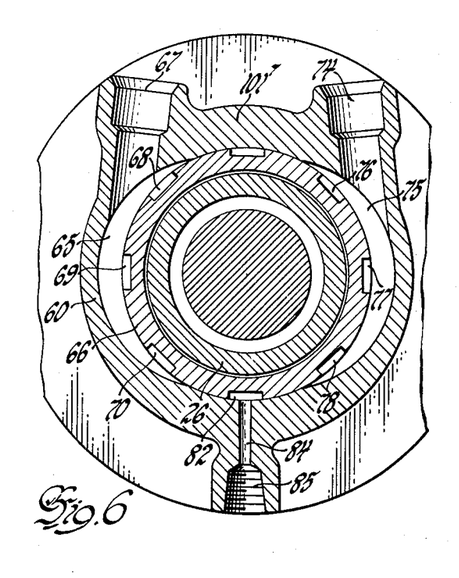
Figure 6 is a sectional view taken along the line 6—6 of Figure 5.
Figure 7:
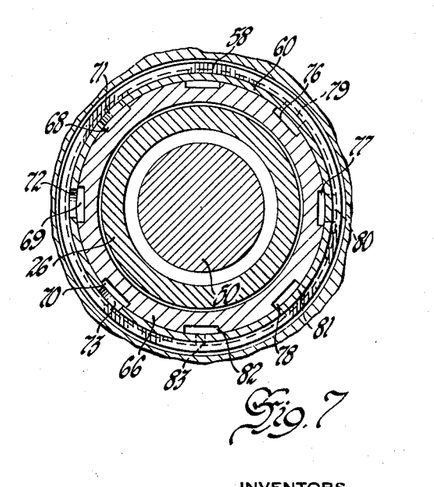
Figure 7 is a sectional view taken along the line 7—7 of Figure 5.

As shown in Figure 6, fluid under pressure for actuating the cone clutch 17 of Figure 2 may be admitted to a chamber 65 between the housing sleeve 60 and sleeve 66 by way of a passage 67. A series of grooves 68, 69 and 70 formed in sleeve 66 provide channels whereby fluid under pressure may be conducted axially along sleeve 66 from chamber 65 to a series of ports 71, 72 and 73 drilled in housing sleeve 60, see Figs. 5 and 7. Ports 71, 72 and 73 communicate with groove 58 in housing sleeve 60, groove 58, in turn, being in communication with servo chamber 16 through a port 59 (see Fig. 2). Fluid under pressure for actuating direct-drive clutch servo piston 19 may be admitted to a chamber 75 between housing sleeve 60 and sleeve 66 by way of a passage 74. It will be noted that chambers 65 and 75 at opposite sides of sleeve 66 are hydraulically separated from each other by contact of sleeve 66 with housing portion 101'. A series of grooves 76, 77 and 78 in sleeve 66 conduct oil from chamber 75 to drilled ports 79, 80 and 81 in sleeve 60 to admit oil to groove 62 of sleeve 60. Oil from groove 62 is admitted to servo chamber 20 through port 18a, see Fig. 2, to apply clutch 21—22.

As shown in Figures 5 and 6, a channel 82 in sleeve 66 communicates with groove 62 of Fig. 5 by means of a port 83 so that fluid pressure supplied to direct drive clutch chamber 20 of Figures 1 and 2 is also conducted through channel 82 and a port 84 to a passage 85 for purposes hereafter more particularly set forth.

In Figures 1 and 3 there is shown a manually shiftable sliding gear box adapted to provide forward direct drive, neutral, or reverse drive. A gear 86 splined to shaft 50 and driven by shaft 50 carries clutch teeth 87 formed integrally with the gear. Gear 86 meshes with a gear 88, the gear 88, in turn, being in mesh with a gear 89. Gear 89 is fixed to a tubular shaft 90 having a gear 91 fixed thereto so that gears 89 and 91 are fixed to each other and rotate as a unit. In Figures 1 and 3, gear 91 is shown in mesh with a gear 93 formed upon a slide member 94 splined to a hub 95 fixed to shaft 110. In the position shown shaft 110 will rotate in the reverse direction to that of shaft 50. An arm 96 on a shaft 97 may be connected to an actuator 98 positioned in a groove 99 in slide member 94. Rotation of shaft 97 will cause axial motion of slide member 94 on splined hub 95 to position gear 93 in mesh with gear 91, or to cause the splines on member 94 to mesh with clutch teeth 87 of gear 86. When member 94 is clutched to teeth 87, the transmission is in direct drive. Member 94 may be positioned in an intermediate position wherein gear 93 is out of mesh with gear 91 and wherein clutch member 94 is not engaged with clutch teeth 87 to establish a positive neutral.

Figure 4:
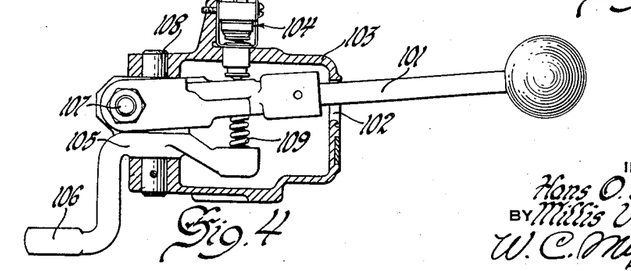
Figure 4 is a view of the control handle for controlling the slide gear unit with the casing partially broken away.

Arm 96 of Figure 3 may be connected to an arm 106 of Figure 4 by any suitable mechanical linkage, not shown. As shown in Figures 4 and 4A, a control handle 101, positioned in the vehicle drivers' compartment may be moved through a slot 102 provided in a housing 103 to select Forward, Neutral or Reverse operation. To move handle 101 from one position to another it is necessary that the handle be positioned in the long slot 102 and out of the short laterally extending slots 102A, 102B, 102C connecting to slot 102. Whenever handle 101 is positioned in slot 102, a switch 104 is closed for purposes hereafter more particularly explained. Whenever handle 101 is positioned in one of the short slots, 102A or 102C of Fig. 4A connected to slot 101 the switch 104 is open. As shown in Figure 4, the handle 101 is fastened to a hub 105 of arm 106, the handle 101 being secured to hub 105 by a bolt 107 so that the handle may pivot on bolt 107 but so that movement of the handle in slot 102 will cause rotation of hub 105 and arm 106 with respect to pivot shaft 108. Arm 106 may be connected to arm 96 of Figure 3 by any suitable mechanical linkage, not shown. A spring 109 disposed between hub 105 and handle 101 yieldably biases handle 101 to enter any one of slots 102A, 102B or 102C when the handle is disposed opposite such slot to open switch 104. Thus, during movement of handle 101 in slot 102, switch 104 will be closed, but upon release of handle 101 after selection of any drive condition of operation such as forward or reverse, switch 104 will be opened.

Figure 8:
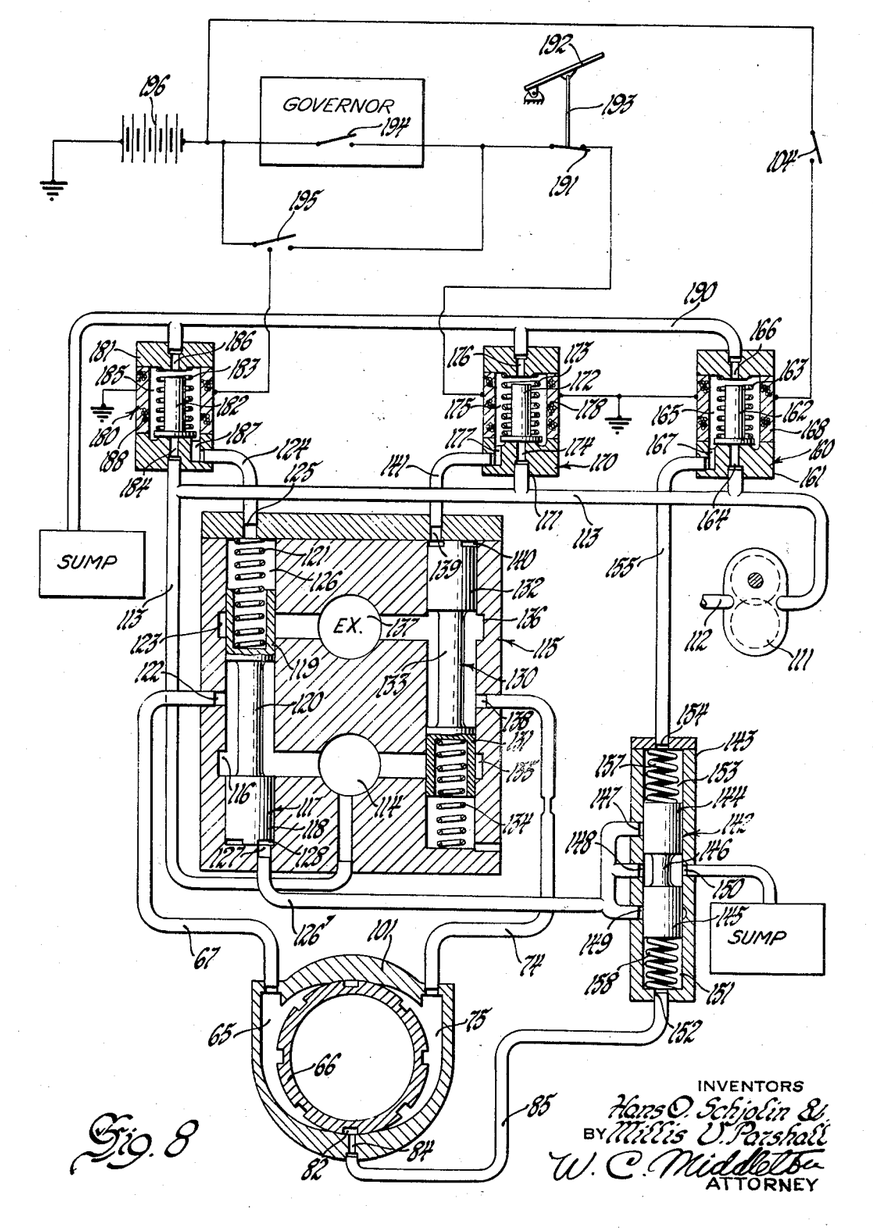
Figure 8 is a schematic diagram of a control system which may be used in connection with the transmission arrangement of Figures 1, 5, 6 and 7.

Referring to Figure 8, there is shown a schematic diagram of a control system for controlling the clutches of Figure 2. An engine driven pump 111 draws oil from a sump (not shown) through a passage 112 and delivers oil under pressure to a passage 113. A pressure regulator valve, not shown, may be positioned upon the delivery side of pump 111 to maintain the pressure in passage 113 at a constant value. Passage 113 is connected to a port 114 in a valve body 115, the port 114 being connected to a port 116 associated with a converter clutch control valve 117. Valve 117 includes a pair of lands 118 and 119 joined by a reduced stem portion 120. A spring 121 yieldably biases valve 117 to connect port 116 to a port 122, the port 122 being connected to chamber 65 by way of passage 67. Port 123 of valve 117 is connected to an exhaust port 137. A chamber 126 at one end of valve 117 is connected to a passage 124 by a port 125. A chamber 128 is connected to a passage 126 by port 127.

A direct drive clutch control valve 130 includes lands 131 and 132 joined by reduced stem section 133. A spring 134 yieldably biases valve 130 to block off a pressure supply port 135 connected to port 114 and to connect an exhaust port 136 to exhaust port 137. A port 138 connects to passage 74 leading to chamber 75. A port 139 connects a chamber 140 at one end of land 132 to a passage 141.

A shuttle valve 142 in a housing 143 includes a pair of lands 144 and 145 joined by a reduced stem section 146. Ports 147, 148, and 149 connect the valve bore to passage 126'. A port 150 connects the valve bore to sump. A chamber 151 at one end of valve 142 is connected to passage 85 by port 152. A chamber 153 at another end of valve 142 is connected to a passage 155 by a port 154. Centering springs 157 and 158 at opposite ends of valve 142 yieldably bias valve 142 to a position wherein passage 126' is connected to exhaust port 150 by way of port 148 while ports 147 and 149 are blocked off by lands 144 and 145, respectively. A battery 196 provides a source of electrical energy for energizing any one of three solenoid valves as hereafter more fully explained.

A solenoid valve 160 includes a housing 161 and a valve member 162 biased by a spring 163 to block off a pressure supply port 164 connected to passage 113. An exhaust passage 190 is connected to a chamber 165 by way of port 166. A port 167 connects passage 155 to chamber 165. A solenoid coil 168 may be energized by closing switch 104 as heretofore explained in connection with the operation of handle 101 of Figure 4. When energized, solenoid coil 168 causes valve 162 to move against spring 163 to block off exhaust port 166 and to connect passage 113 to passage 155 by way of ports 164 and 167. When solenoid coil 168 is deenergized, spring 163 positions valve 162 to connect passage 155 to exhaust passage 190 by way of port 167, chamber 165 and port 166. At the same time, valve 162 blocks off port 164.

A second solenoid valve 170 includes a housing 171 and a valve member 172 biased by a spring 173 to block off a pressure supply port 174 connected to passage 113. An exhaust passage 190 is connected to a chamber 175 by way of a port 176. A port 177 connects passage 141 to chamber 175. A solenoid coil 178 may be energized or deenergized by operation of a pair of switches 194 and 191 as hereafter more fully explained. When energized, solenoid coil 178 causes valve 172 to move against spring 173 to block off exhaust port 176 and to connect passage 113 to passage 141 by way of ports 174 and 177. When solenoid coil 178 is deenergized, spring 173 positions valve 172 to connect passage 141 to exhaust passage 190 by way of ports 177, chamber 175 and port 176. In this position of valve 172, the valve 172 blocks off pressure supply port 174.

A third solenoid valve 180 which is used for engine braking purposes includes a housing 181 and a valve member 182 biased by a spring 183 to block off a pressure supply port 184 connected to passage 113. An exhaust passage 190 is connected to a chamber 185 by way of a port 186. A port 187 connects chamber 185 to passage 124. A solenoid coil 188 may be energized or deenergized by operation of a manually controllable switch 195 located in the vehicle drivers' compartment. When switch 195 is closed, solenoid coil 188 causes valve 182 to move against spring 183 to connect passage 124 to pressure supply passage 113 by way of ports 184 and 187 and to block off exhaust port 186. When switch 195 is opened, spring 183 positions valve 182 to block off pressure supply port 184 and to connect passage 124 to exhaust passage 190 by way of port 187, chamber 185 and port 186.

Switch 191 is normally closed by means of a spring, not shown, but may be opened by forcing the vehicle accelerator pedal 192 past its full throttle position. Accelerator pedal 192 carries a stem 193 which will contact switch 191 to open the switch only after the accelerator pedal has been depressed beyond the normal full throttle position.

Switch 194 is a governor controlled switch which is normally open at speeds below a predetermined speed and is closed at speeds above a predetermined speed such as, for example, 18 miles per hour. Such switches are in themselves well known and constitute no part of the invention except as employed in the present combination. The governor for controlling switch 194 may be responsive to the vehicle drive shaft so as to be indicative of vehicle speed.

*Operation*

Assuming that the vehicle is standing still with the engine running, and switches 104, 194, and 195 are each open, converter clutch control valve 117 will be positioned by spring 121 to connect passage 113 to passage 67 by way of ports 116 and 122. Accelerator pedal controlled switch 191 will normally be closed, but with the vehicle standing still, governor controlled switch 194, which is in series with switch 191, is open. At the same time, direct drive clutch control valve 130 will be positioned by spring 134 to connect passage 74 to exhaust port 137 by way of ports 138 and 136. Pressure supplied to passage 113 by pump 111 will pass through valve 117 to passage 67 and chamber 65. As heretofore explained, chamber 65 is connected to ports 71, 72 and 73, respectively, see Fig. 7, the ports 71, 72 and 73 being connected to groove 58 of Fig. 2 and groove 58 being connected to servo chamber 16 by way of port 59. Pressure in servo chamber 16 applies cone clutch 21 to drive the vehicle through torque converter unit A. With the slide gear unit 94 positioned for direct drive the vehicle will be driven through torque converter unit A.

Upon acceleration of the vehicle to a predetermined speed, for example, 18 miles per hour, governor controlled switch 194 will be closed, thereby energizing solenoid coil 178, to position valve 172 to admit fluid pressure to chamber 140 of valve 130 by way of ports 174 and 177 and passage 141. Pressure in chamber 140 will cause valve 130 to move against spring 134 to admit pressure to chamber 75 by way of ports 135 and 138. As heretofore explained, chamber 175 is connected to groove 62 of Figures 2 and 5 by way of channels 76, 77, 78 and ports 79, 80 and 81 of Figure 7. Groove 62 is connected to direct clutch servo chamber 20 of Figure 2 by way of port 18a of Fig. 2. Pressure in chamber 20 will cause piston 19 of Figure 2 to apply the direct drive double clutch 21—22. Passage 82, connected to chamber 20 by port 83 is a signal passage which admits signal pressure from direct drive clutch servo 20 to passage 85, the passage 85 being connected to chamber 151 of shuttle valve 142 of Fig. 8. Upon application of the direct drive clutch 21—22, pressure in chamber 151 will move valve 142 against spring 157 to block off exhaust port 150 and to admit fluid under pressure from passage 85 to passage 126' by way of port 149. This pressure, acting in chamber 128 of valve 117 will move valve 117 against spring 121 to connect passage 67 to exhaust port 137 by way of ports 122 and 123 to release the cone clutch 24. Since clutch 24 cannot be released until clutch 21—22 is applied, a shift under torque without engine run-away and without the necessity of releasing the accelerator pedal to prevent engine run-away is achieved. With clutch 21—22 applied and clutch 24 released direct drive is obtained.

*Forced downshift*

When operating in direct drive, a shift from direct drive to converter drive may be accomplished by simply depressing the accelerator pedal 192 past its normal full throttle position to open switch 191. With switch 191 open, solenoid coil 178 will be deenergized irrespective of the action of governor switch 194 since these two switches are in series. When solenoid coil 178 is deenergized, spring 173 will position valve 172 to connect chamber 140 of valve 130 to exhaust, thereby enabling spring 134 to position valve 130 to connect passage 74 and the direct drive clutch servo to exhaust. Upon exhaust of fluid under pressure from clutch servo 20, pressure in passage 85 is also exhausted through valve 130, thereby enabling centering springs 157 and 158 to position shuttle valve 142 to connect passage 126' and chamber 128 of valve 117 to exhaust. Spring 121 will thereupon position valve 117 to admit pressure to passage 67 and hence to cone clutch servo chamber 16 to apply clutch 24. The transmission will thereupon drive through cone clutch 24 and torque converter unit A.

*Engine braking*

Direct drive clutch 21—22 and cone clutch 24 may both be applied simultaneously to provide both hydrodynamic engine braking in addition to normal engine braking by closing switch 195. Assuming that the vehicle is being operated in direct drive as heretofore explained, normal engine braking will result when the accelerator pedal is released in descending a long or steep grade. Additional hydrodynamic braking in the torque converter can be obtained by closing switch 195. Such action will open valve 182 to admit pressure from passage 113 to chamber 126 of valve 117 by way of ports 184, 187 and passage 124. Pressure in chamber 126 of valve 117 will counteract the effect of pressure in chamber 128, thereby permitting spring 121 to position valve 117 to admit pressure to converter clutch apply passage 67 even though the direct drive clutch 21—22 is applied and pressure exists in passage 126' and chamber 128. Application of clutch 24 will result in considerable churning of the oil in the torque converter unit A which absorbs energy and gives a considerable additional braking effect over that of normal engine braking. This hydrodynamic or churn braking results in less usage of the normal vehicle brakes with consequent length of brake life and less repairs to the vehicle brakes.

*Neutral*

A neutral condition of operation may be had even though the slide gear unit C is conditioned for forward or reverse drive by closing switch 104. With switch 104 closed, coil 168 is energized to position valve 162 to admit pressure from passage 113 to passage 155 and chamber 153 though ports 164 and 167. Pressure in chamber 153 will move shuttle valve 142 against spring 158 to block off exhaust port 150 and admit pressure to passage 126 and chamber 128 of valve 117 by way of port 147. Fluid pressure in chamber 128 will thereupon move valve 117 against spring 121 to connect the torque converter clutch apply passage 67 to exhaust port 137 by way of ports 122 and 123. With the vehicle at idle, or speeds below the predetermined speed at which governor switch 194 is closed, valve 130 will be positioned to connect passage 74 to exhaust port 137 by way of ports 138 and 136. With both clutch servos thus connected to exhaust, both clutches 24 and double clutch 21—22 will be disengaged so that no drive can be imparted to shaft 50. When the selector lever is placed opposite slot 104B of Figure 4A, the gear box C will provide a positive neutral whether the switch 104 is closed or open. Thus, even though lever 101 may be placed in slot 102B and thereby open stitch 104, no drive to shaft 110 can be had because the slide gear unit 94 is disengaged both from gear 91 and clutch teeth 87.

It is to be understood that this invention need not be limited to the specific constructions and arrangements shown and described except only insofar as the claims may be so limited, as it will be apparent to those skilled in the art that various changes may be made without departing from the principles of the invention.

We claim:

1. In combination in a transmission, a power input shaft, a manually shiftable slide gear unit, an intermediate shaft for transmitting torque from said power input shaft to said slide gear unit, torque transmitting means for connecting said intermediate shaft to said power input shaft through one torque path including a first clutch, torque transmitting means for connecting said intermediate shaft to said power input shaft including a second clutch, a fluid pressure source, fluid pressure responsive servo motors associated with said clutches, respectively, for actuating the same, a shift valve hydraulically connected to said fluid pressure source and to one of said clutch servo motors, means yieldably biasing said shaft valve to admit fluid pressure from said source to said one servo motor to engage said one clutch, a shift lever for selecting the drive condition of said slide gear unit, and means controlled by said shift lever effective to position said shift valve to connect said one servo motor to exhaust during movement of said shift lever to change the drive condition of said slide gear unit, said last-mentioned means being automatically effective upon completion of change of the drive condition of said slide gear unit to re-establish the connection between said one servo motor and said fluid pressure source to re-establish drive through said one clutch.

2. In combination in a transmission, a power input shaft, a manually shiftable slide gear unit, an intermediate shaft for transmitting torque from said power input shaft to said slide gear unit, torque transmitting means for connecting said intermediate shaft to said power input shaft through one torque path including a first clutch, torque transmitting means for connecting said intermediate shaft to said power input shaft including a second clutch, a fluid pressure source, fluid pressure responsive servo motors associated with said clutches, respectively, for actuating the same, a shift valve hydraulically connected to said source and to one of said clutch servo motors, means yieldably biasing said shift valve to admit fluid pressure from said source to said one servo motor to engage said one clutch, a shift lever for selecting the drive condition of said slide gear unit, and means controlled by said shift lever including an additional valve and a shuttle valve in series with said additional valve effective to position said shift valve to connect said one servo motor to exhaust during movement of said shift lever to change the drive condition of said slide gear unit, said last-mentioned means being automatically effective upon completion of change of drive condition of said slide gear unit to permit said shift valve to re-establish the connection between said one servo motor and said fluid pressure source to re-establish drive through said one clutch.

3. In combination in a transmission, a power input shaft, a manually shiftable slide gear unit, an intermediate shaft for transmitting torque from said power input shaft to said slide gear unit, torque transmitting means for connecting said intermediate shaft to said power input shaft through one torque path including a first clutch, torque transmitting means for connecting said intermediate shaft to said power input shaft including a second clutch, a fluid pressure source, fluid pressure responsive servo motors associated with said clutches, respectively, for actuating the same, a first shift valve hydraulically connected to said source and to one of said servo motors, means yieldably biasing said first shift valve to admit fluid pressure to said one servo motor to engage said one clutch, a shift lever for selecting the drive condition of said slide gear unit, means controlled by said shift lever including an additional valve and a shuttle valve in series with said additional valve effective to position said first shift valve to connect said one servo motor to exhaust during movement of said shift lever to change the drive condition of said slide gear unit, said last-mentioned means being effective upon completion of change of drive condition of said slide gear unit to permit said first shift valve to re-establish the connection between said one servo motor and said source to re-establish drive through said one clutch, a second shift valve connected to said fluid pressure source and to a second of said servo motors, means yieldably biasing said second shift valve to connect said second servo motor to exhaust, means operable to position said second shift valve to connect said second servo to said source to engage said second clutch, a connection between said second shift valve and said first shift valve, said shuttle valve being effective in one position of said second shift valve to block off said connection, said shuttle valve being responsive to fluid pressure delivered by said second shift valve to admit fluid pressure from said second shift valve to said first shift valve to position said first shift valve to connect said first servo motor to exhaust.

4. The combination set forth in claim 3 including manually operable means effective in one position to position said first shift valve to admit fluid pressure from said source to said first servo motor to engage said first clutch irrespective of the position of said second shift valve and said shuttle valve.

5. The combination set forth in claim 3 including a solenoid valve and a manually operable switch effective in one position to energize said solenoid valve to admit fluid pressure from said source to said first shift valve to position said first shift valve to admit fluid pressure to said first servo motor irrespective of the position of said second shift valve and said shuttle valve.

6. In combination in a transmission, a power input shaft, a manually shiftable slide gear unit, an intermediate shaft for transmitting torque from said power input shaft to said slide gear unit, torque transmitting means for connecting said intermediate shaft to said power input shaft through one torque path including a first clutch, torque transmitting means for connecting said intermediate shaft to said power input shaft including a second clutch, a fluid pressure source, fluid pressure responsive servo motors associated with said clutches, respectively, for actuating the same, a first shift valve hydraulically connected to said source and to one of said servo motors, means yieldably biasing said first shift valve to admit fluid pressure to said one servo motor to engage said one clutch, a shift lever for selecting the drive condition of said slide gear unit, means controlled by said shift lever including an additional valve and a shuttle valve in series with said additional valve effective to position said first shift valve to connect said one servo motor to exhaust during movement of said shift lever to change the drive condition of said slide gear unit, said last-mentioned means being effective upon completion of change of drive condition of said slide gear unit to permit said first shift valve to re-establish the connection between said one servo motor and said source to re-establish drive through said one clutch, a second shift valve connected to said fluid pressure source and to a second of said servo motors, means yieldably biasing said second shift valve to connect said second servo motor to exhaust, means including a governor controlled valve operable to position said second shift valve to connect said second servo to said source, a connection between said second and first shift valves, said shuttle valve being effective in one position of said second shift valve to block off said connection, said shuttle valve being responsive to fluid pressure delivered by said second shift valve to admit fluid pressure from said second shift valve to said first shift valve to position said first shift valve to connect said first servo motor to exhaust.

7. The combination set forth in claim 6 including manually controllable valve means selectively operable to deliver fluid pressure from said source to said first shift valve to position said first shift valve to connect said first servo motor to said fluid pressure source irrespective of the position of said second shift valve.

8. In combination in a transmission having a power input shaft and a manually shiftable gear box, an intermediate shaft for transmitting torque from said power input shaft to said gear box, a shift lever for controlling said gear box, a fluid pressure source, torque transmitting means for connecting said intermediate shaft to said power input shaft through one torque path including a first clutch, torque transmitting means for connecting said intermediate shaft to said power input shaft through a second torque path including a second clutch, first and second fluid pressure responsive servo members for actuating said clutches, respectively, valve means for controlling the admission of fluid pressure from said source to said said servo member, means yieldably biasing said valve means to connect said first servo member to said fluid pressure source, a control chamber associated with said valve means, additional valve means for controlling the admission of fluid pressure from said source to said second servo member, means yieldably biasing said additional valve means to connect said second servo member to exhaust, and means including a valve controlled by said shift lever for delivering fluid pressure from said source to said control chamber for positioning said first valve to connect said first clutch servo member to exhaust upon movement of said shift lever to change the drive condition of said manually shiftable gear box.

9. In combination in a transmission having a manually controllable gear box, a shift lever for controlling said gear box, a fluid pressure source, a power input shaft, means for connecting said power input shaft to said gear box including a pair of clutches selectively operable to drive said gear box through different torque paths, first and second fluid pressure responsive servo members for actuating said clutches, respectively, valve means for controlling the admission of fluid pressure from said source to said first servo member, means yieldably biasing said valve means to connect said first servo member to said fluid pressure source, a control chamber associated with said valve means, a shuttle valve connected to said control chamber, means yieldably biasing said shuttle valve to connect said control chamber to exhaust, an additional valve for controlling the admission of fluid pressure to said second servo member, means yieldably biasing said additional valve to connect said second servo member to exhaust, and a valve controlled by said shift lever effective in one position thereof to deliver fluid pressure from said source to said control chamber through said shuttle valve, the pressure delivered by said shift lever controlled valve being effective to position said shuttle valve to block off said control chamber from exhaust and to position said first-mentioned valve means to connect said first servo member to exhaust upon movement of said shift lever to change the drive condition of said manually shiftable gear box.

10. In combination in a transmission having a power shaft and a load shaft, means for connecting said load shaft to said power input shaft including a pair of clutches selectively operable to drive said load shaft through different torque paths, first and second fluid pressure responsive servo members for actuating said clutches, respectively, a fluid pressure source, a first shift valve for controlling the admission of fluid pressure from said source to said first servo member, means yieldably biasing said first shift valve to connect said first servo member to said fluid pressure source, a control chamber associated with said first shift valve, a shuttle valve connected to said control chamber, means yieldably biasing said shuttle valve to connect said control chamber to exhaust, a second shift valve for controlling the admission of fluid pressure from said source to said second servo member, means yieldably biasing said second shift valve to connect said second servo member to exhaust, a control chamber associated with said second shift valve, a governor controlled valve effective in one position thereof to deliver fluid pressure from said source to said last-mentioned control chamber, said second shift valve being movable in response to fluid pressure in said last-mentioned control chamber to deliver fluid pressure from said source to said second servo member, means connecting the fluid pressure delivered by said second shift valve to said shuttle valve, said shuttle valve being movable by fluid pressure delivered thereto by said second shift valve to block off said first-mentioned shift valve control chamber from exhaust and to connect said first-mentioned shift valve control chamber to fluid pressure delivered by said second-mentioned shift valve, said first-mentioned shift valve being responsive to fluid pressure in said first-mentioned shift valve control chamber to connect said first servo member to exhaust.

11. The combination set forth in claim 10 including a second control chamber associated with said first shift valve, a manually controllable valve effective in one position to connect said second control chamber to exhaust and effective in a second position to connect said second control chamber to said fluid pressure source, said first shift valve being movable responsive to fluid pressure delivered to said second control chamber to connect said first servo to said fluid pressure source irrespective of the position of said second shift valve.

12. In combination in a transmission having a power shaft and a load shaft, means for connecting said load shaft to said power shaft including a pair of clutches selectively operable to drive said load shaft through different torque paths, first and second fluid pressure responsive servos for actuating said clutches, respectively, a fluid pressure source, a first shift valve for controlling the admission of fluid pressure from said source to said first servo, means yieldably biasing said first shift valve to connect said first servo to said fluid pressure source, a first control chamber associated with said first shift valve, a second control chamber associated with said first shift valve, a shuttle valve connected to said first control chamber, means yieldably positioning said shuttle valve to connect said first control chamber to exhaust, a second shift valve for controlling the admission of fluid pressure from said source to said second servo member, means yieldably biasing said second shift valve to connect said second servo to exhaust, a control chamber associated with said second shift valve, a governor controlled valve effective in one position to deliver fluid pressure from said source to said second shift valve control chamber to position said second shift valve to admit fluid pressure from said source to said second servo and to a control chamber associated with said shuttle valve to position said shuttle valve to block off said first mentioned shift valve control chamber from exhaust and to admit fluid pressure thereto, and a manually controllable valve effective in one position to connect the second control chamber of said first shift valve to exhaust, said manually controllable valve being effective in a second position to connect said second control chamber of said first shift valve to said fluid pressure source to position said first shift valve to admit fluid pressure to said first servo irrespective of the position of said second shift valve.

13. In combination in a transmission having a manually shiftable gear box, a shift lever for controlling said gear box, a fluid pressure source, a power input shaft, means for connecting said gear box to said power input shaft including a pair of clutches selectively operable to drive said gear box through different torque paths, first and second fluid pressure responsive servos for actuating said clutches, respectively, a first shift valve for controlling the admission of fluid pressure from said source to said first servo, means yieldably biasing said first shift valve to connect said first servo to said fluid pressure source to engage said first clutch, a control chamber associated with said first shift valve, a shuttle valve connected to said control chamber, means yieldably positioning said shuttle valve to connect said control chamber to exhaust, a second shift valve for controlling the admission of fluid pressure from said source to said second servo, means yieldably biasing said second shift valve to connect said second servo to exhaust to release said second clutch, a control chamber associated with said second shift valve, a pair of control chambers associated with said shuttle valve, a governor controlled valve effective in one position to connect said second shift valve control chamber to exhaust and effective in a second position to connect said second shift valve control chamber to said fluid pressure source, said second shift valve being movable by fluid pressure admitted to said second shift valve control chamber to a position to deliver fluid pressure to said second servo to engage said clutch and to deliver fluid pressure to one of said shuttle valve control chambers, said shuttle valve being movable by fluid pressure delivered by said second shift valve to block off said first shift valve control chamber from exhaust and to connect said first shift valve control chamber to fluid pressure delivered by said second shift valve, said first shift valve being movable by fluid pressure in said first shift valve control chamber to connect said first servo to exhaust, and valve means controlled by said shift lever to control the admission of fluid pressure from said fluid pressure source to a second of said pair of shuttle valve control chambers, said last mentioned valve means being effective in certain predetermined positions of said shift lever to connect said second shuttle valve control chamber to exhaust, said last mentioned valve means being controlled by said shift lever during movement of said shift lever from one position to another to direct fluid pressure to said second shuttle valve control chamber, said shuttle valve being movable by fluid pressure in said last-mentioned control chamber to block off said first shift valve control chamber from exhaust and to admit fluid pressure to said first shift valve control chamber to position said first shift valve to connect said first servo to exhaust.

14. In combination in a transmission having a manually controllable gear box, a shift lever for controlling said gear box, a fluid pressure source, a power input shaft, means for connecting said gear box to said power input shaft including a pair of clutches selectively operable to drive said gear box through different torque paths, first and second fluid pressure responsive servos for actuating said clutches, respectively, a shift valve for controlling the admission of fluid pressure from said source to said first servo, means yieldably biasing said shift valve to connect said first servo to said fluid pressure source, a control chamber associated with said shift valve, a second shift valve for controlling the admission of fluid pressure from said source to said second servo, means yieldably biasing said second shift valve to connect said second servo to exhaust, a shuttle valve connected to said first shift valve control chamber, means yieldably biasing said shuttle valve to connect said first shift valve control chamber to exhaust, a control chamber associated with said shuttle valve, a solenoid valve for controlling the admission of fluid pressure from said source to said shuttle valve control chamber, means yieldably biasing said solenoid valve to connect said shuttle valve control chamber to exhaust, and a switch controlled by said shift lever effective during movement of said shift lever from one position to another to energize said solenoid valve, said solenoid valve being effective when energized to deliver fluid pressure from said source to said shuttle valve control chamber, said shuttle valve being movable in response to fluid pressure in said shuttle valve control chamber to block off said first shift valve control chamber from exhaust and to deliver fluid pressure to said first shift valve control chamber, said first shift valve being movable in response to fluid pressure in said first shift valve control chamber to connect said first servo to exhaust.

15. In combination in a transmission having a manually controlled gear box, a shift lever for controlling said gear box, a fluid pressure source, a power input shaft, means for connecting said gear box to said power input shaft including a pair of clutches selectively operable to drive said gear box through different torque paths, first and second fluid pressure responsive servos for actuating said clutches, respectively, a shift valve for controlling the admission of fluid pressure from said source to said first servo, means yieldably biasing said shift valve to connect said first servo to said fluid pressure source, a control chamber associated with said shift valve, a second shift valve for controlling the admission of fluid pressure from said source to said second servo, means yieldably biasing said second shift valve to connect said second servo to exhaust, a control chamber associated with said second shift valve, a shuttle valve connected to said first shift valve control chamber, means yieldably biasing said shuttle valve to connect said first shift valve control chamber to exhaust, a control chamber associated with said shuttle valve, a solenoid valve for controlling the admission of fluid pressure from said source to said shuttle valve control chamber, said shuttle valve being movable in response to fluid pressure admitted to said shuttle valve control chamber to admit fluid pressure to said first shift valve control chamber, said first shift valve being movable in response to fluid pressure in said first shift valve control chamber to connect said first servo to exhaust, a switch operated by said shift lever effective to energize said solenoid valve to admit fluid pressure from said source to said first shift valve control chamber through said shuttle valve upon movement of said shift lever to change the drive condition of said gear box, a solenoid valve for controlling the admission of fluid pressure from said source to said second shift valve control chamber, said second shift valve being movable in response to fluid pressure in said second shift valve control chamber to connect said second servo to exhaust, and a governor operated switch effective in one position to energize said last-mentioned solenoid valve to admit fluid pressure from said source to said second shift valve control chamber.

16. The combination set forth in claim 15 including a manually operated switch in series with said governor controlled switch and selectively operable to deenergize the solenoid valve controlled by said governor switch irrespective of the position of said governor switch.

17. In combination in a transmission having a power shaft and a load shaft, means for connecting said power shaft to said load shaft including a pair of clutches selectively operable to drive said load shaft through different torque paths, first and second fluid pressure responsive servos for actuating said clutches, respectively, a fluid pressure source, a first shift valve for controlling the admission of fluid pressure from said source to said first servo, means yieldably biasing said first shift valve to connect said first servo to said fluid pressure source to engage one of said pair of clutches, a first control chamber associated with said first shift valve, a shuttle valve connected to said control chamber, a control chamber associated with said shuttle valve, means yieldably biasing said shuttle valve to connect said control chamber to exhaust, a second shift valve for controlling the admission of fluid pressure from said source to said second servo, means yieldably biasing said second shift valve to connect said second servo to exhaust to release the second of said pair of clutches, a control chamber associated with said second shift valve, a governor controlled solenoid valve effective in one position to connect said second shift valve control chamber to exhaust and effective in a second position to admit fluid pressure from said source to said second shift valve control chamber, said second shift valve being movable in response to fluid pressure admitted to said second shift valve control chamber to admit fluid pressure to said second servo to apply said second clutch and to said shuttle valve control chamber, said shuttle valve being movable in response to fluid pressure in said shuttle valve control chamber to block off said first shift valve control chamber from exhaust and to admit fluid pressure to said first shift valve control chamber, said first shift valve being movable in response to fluid pressure in said first shift valve control chamber to connect said first servo to exhaust to release said first clutch.

18. The combination set forth in claim 17 including a second control chamber associated with said first shift valve, a solenoid valve effective in one position to connect said second control chamber to exhaust and effective in a second position to connect said second control chamber to said fluid pressure source, said first shift valve biasing means being effective when fluid pressure is admitted to the second control chamber of said first shift valve to position said first shift valve to admit fluid pressure to said first servo to engage said first clutch when said second shift valve is positioned to admit fluid pressure to said second servo to engage said second clutch, and a manually operable switch for controlling the position of said solenoid valve.

19. The combination set forth in claim 17 including a switch in series with said governor controlled switch and movable to one position to render said governor controlled switch ineffective to energize the solenoid valve associated with said second shift valve.

20. In combination in a transmission having a manually controlled gear box, a shift lever for controlling said gear box, a power input shaft, means for connecting said gear box to said power input shaft including a pair of clutches selectively operable to drive said gear box through different torque paths, first and second fluid pressure responsive servos for actuating said clutches, respectively, a fluid pressure source, a shift valve for controlling the admission of fluid pressure from said source to said first servo, means yieldably biasing said shift valve to connect said first servo to apply one of said clutches, first and second control chambers associated with said shift valve, a shuttle valve connected to said first control chamber, means yieldably biasing said shuttle valve to connect said first control chamber to exhaust, first and second control chambers associated with said shuttle valve, a solenoid valve connected to said first shuttle valve control chamber and to said fluid pressure source, means yieldably biasing said solenoid valve to connect said first shuttle valve control chamber to exhaust, a switch controlled by said shift lever effective during movement of said shift lever to control said gear box to energize said solenoid valve to position said solenoid valve to connect said first shuttle valve control chamber to said fluid pressure source, said shuttle valve being movable in response to fluid pressure in said first shuttle valve control chamber to connect said first shift valve control chamber to said fluid pressure source, said shift valve being movable in response to fluid pressure in said first shift valve control chamber to connect said first servo to exhaust to release said first clutch, said shift lever being effective upon completion of shift of said gear box to open said switch to deenergize said solenoid valve, a second shift valve connected to said fluid pressure source and to said second servo for controlling the admission of fluid pressure to said second servo, means yieldably biasing said second shift valve to connect said second servo to exhaust to release said second clutch, a control chamber associated with said second shift valve, a solenoid valve connected to said last-mentioned control chamber and to said fluid pressure source, means yieldably biasing said solenoid valve to connect said last-mentioned control chamber to exhaust, a governor controlled switch effective in one position to energize said last-mentioned solenoid valve to position said solenoid valve to admit fluid pressure from said source to said last-mentioned control chamber, said second shift valve being movable in response to fluid pressure in said last-mentioned control chamber to admit fluid pressure to said second servo to apply said second clutch and to said second shuttle valve control chamber, said shuttle valve being movable in response to fluid pressure in said second shuttle valve control chamber to admit fluid pressure to said first shift valve control chamber to position said first shift valve to connect said first servo to exhaust, a solenoid valve connected to the second of said control chambers associated with said first-mentioned shift valve and to said fluid pressure source, means yieldably positioning said last-mentioned solenoid valve to connect said last-mentioned control chamber to exhaust, and a manually operable switch effective in one position to energize said last-mentioned solenoid valve, said last-mentioned solenoid valve being effective when energized to connect said last-mentioned control chamber to said fluid pressure source, said first-mentioned control valve being movable by fluid pressure in said last-mentioned control chamber to connect said first servo to said fluid pressure source irrespective of the position of said second shift valve.

References Cited in the file of this patent
UNITED STATES PATENTS

| | | |
|---|---|---|
| 2,374,303 | Osborne | Apr. 24, 1945 |
| 2,435,930 | Schjolin | Feb. 10, 1948 |
| 2,757,557 | Hoffman | Aug. 7, 1956 |